United States Patent Office 3,150,164
Patented Sept. 22, 1964

3,150,164
DISULFONYLHEPTATRIENE TETRACARBO-
NITRILES AND THEIR PREPARATION
Elmore L. Martin, Wilmington, Del., assignor to E. I.
du Pont de Nemours and Company, Wilmington, Del.,
a corporation of Delaware
No Drawing. Filed May 22, 1962, Ser. No. 196,601
4 Claims. (Cl. 260—465)

This invention is concerned with a new class of organic compounds and more particularly with a new class of substituted heptatrienes which are useful as dyes, and their preparation.

In recent studies of cyano-containing compounds, it has been shown that 1,2-dicyano-1,2-disulfonylethylenes can be readily obtained from the reaction of a perhalogenated 1,2-dicyanoethylene or -ethane with a salt of an organic sulfinic acid.

It has now been discovered that the 1,2-dicyano-1,2-disulfonylethylenes react with ketones having at least two hydrogen atoms attached to each α-carbon atom (i.e., the α,α,α',α'-tetra hydrogen ketones) to yield the 4-hydroxy - 1,7 - disulfonyl - 1,3,5 - heptatriene-1,2,6,7-tetra-carbonitriles. These products are all colored, most of them blue, and are useful as colorants for films, paper, and textiles.

This application is a continuation-in-part of my copending application U.S. Serial No. 849,733, filed October 30, 1959, now U.S. 3,079,421, issued on February 26, 1963.

The reaction and products of this invention may be illustrated by the following equation:

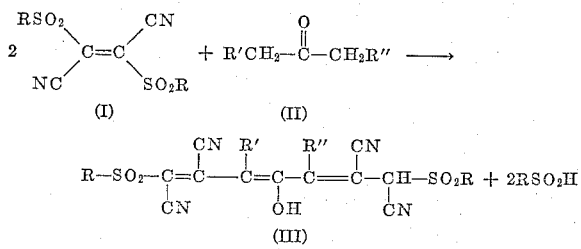

in which R is hydrocarbyl or substituted hydrocarbyl and R' and R" may be hydrogen or hydrocarbyl, with the proviso that R' and R" taken together may be an aliphatic hydrocarbon diradical, i.e., an alkylene radical.

A preferred group of the products of this invention are those of Formula III above in which the R's are hydrocarbyl or substituted hydrocarbyl in which the substituents are amino, hydrocarbyl-substituted amino, hydroxy, carbamoyl, cyano, halo (particularly fluoro, chloro, bromo, and iodo), nitro, sulfo (salt), hydrocarbyloxysulfonyl, hydrocarbyloxy, or hydrocarbyloxycarbonyl.

"Hydrocarbyl" is used in its accepted meaning as representing a radical which is identical to the structure formed from a hydrocarbon by removal of at least one hydrogen atom. The hydrocarbyl groups represented by R, R', and R" in the formulas above may be any radical composed solely of carbon and hydrogen. "Hydrocarbyl" is used in its full generic sense. The wide variation in the hydrocarbyl groups used in the illustrations which follow makes is evident that all hydrocarbyl groups are operable. Hydrocarbyl groups may vary as to whether they are alkyl, cycloalkyl, aryl, aralkyl, alkaryl, single ring, multi ring, aliphatically saturated, aliphatically unsaturated, straight chain, branched chain, large, small, and the like. The widest variation of this sort does not in any way detract from the fundamental characteristic of the hydrocarbyl radical of passing unchanged through the process of this invention and exercising no effect whatever on the chemical steps of the process. Representative hydrocarbyl groups include methyl, ethyl, tert-butyl, isooctyl, dodecyl, octadecyl, eicosyl, vinyl, ethynyl, propargyl, 9,10-octadecenyl, 9,10-octadecynyl, butadienyl, 9,12-octadecadienyl, cyclopropyl, cyclobutyl, cyclohexyl, cyclooctyl, phenyl, naphthyl, anthryl, rubryl, benzyl, phenethyl, duryl, 4-isopropylnaphthyl, chrysyl, and the like.

The limitations of space for disclosure are not to be construed as any limitation within the scope of "hydrocarbyl" contemplated in this invention. Even the most cumbersome hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that hydrocarbyl groups containing 20 or fewer carbon atoms are most available, and to that extent preferred. But there is to be no question of the operability of, or of the intent to include and disclose, any hydrocarbyl group whatsoever.

In the above formulas, the groups particularly preferred for R, R', and R" because of their ready availability through synthetic routes, include alkyl, including aliphatically mono- and polyunsaturated alkyl with up to and including 18 carbon atoms; cycloalkyl with three to ten carbon atoms (as in cyclopropyl, cyclohexyl, and camphyl); aralkyl with 7 to 19 carbon atoms (as in benzyl and triphenylmethyl); and aryl with up to and including 18 carbon atoms (as in phenyl, naphthyl, anthryl, furyl, thienyl, pyrrolyl, quinolyl, anthraquinolyl, dibenzofuryl, and benzanthryl). Preferred embodiments for R also include substituted derivatives of these alkyl, cycloalkyl, aralkyl, and aryl groups carrying one or more substituents such as hydroxy, lower alkoxy, benzyloxy, aryloxy in which the aryl groups have up to 12 carbon atoms (as in phenyl, tolyl, naphthyl, and anthryl), lower alkyl, lower alkylsulfonyl, hydroxy lower alkylsulfonyl, benzylsulfonyl, arylsulfonyl in which the aryl groups have up to 12 carbon atoms (as in phenyl, tolyl, naphthyl, and anthryl), formyl, carbamoyl, cyano, halogen (as in fluoro, chloro, bromo, and iodo), amino, dilower alkylamino, diphenylamino, dibenzylamino, acylamino in which the acyl groups contain up to seven carbon atoms (as in acetyl, butyroyl, and benzoyl), carboxy, lower alkoxycarbonyl, and nitro.

By alkylene, represented by R' and R" taken together, is meant a diradical which is a structure identical to that formed by removal of two hydrogen atoms from an alkane. For example, it may be methylene (as in cyclobutanone), ethylene (as in cyclopentanone), trimethylene (as in cyclohexanone), 2-isopropyltrimethylene (as in 4-isopropylcyclohexanone), heptamethylene (as in decalone), and the like. Alkylene groups with 1–7 carbon atoms in the chain and a total carbon content of 18 carbons or less are preferred.

The 1,2-dicyano-1,2-disulfonylethylenes of Formula I used in the process of this invention are readily prepared by the reaction of two moles of the sodium salt of an organic sulfinic acid with one mole of dichlorofumaronitrile. This reaction is illustrated in detail in the examples which follow. The organic sulfinic acids and their salts are a well-known group of compounds and any suitable member may be used to prepare the corresponding 1,2-dicyano-1,2-disulfonylethylene. Both the cis and trans configurations, as well as mixtures of the two, are operable.

The chemical reaction between compounds I and II, above, to form compound III takes place as indicated between two molar quantities of compound I and one molar quantity of compound II. However, this in no way limits the proportions of these reactants which may be brought together in carrying out the process of this invention. A molecular excess of up to one-hundred-fold or more of either of the specific reactants may serve as a reaction medium for carrying out the process without in any way precluding the isolation of the desired heptatriene product. For practical purposes, molar ratios in the range of 10:1 to 1:10 are preferred.

No added catalyst or reaction medium is required. The reaction of the invention will take place by bringing the reactants into intimate contact. When one or both of the reactants are liquid, intimate contact is readily obtained by agitating them together. A molar excess of the liquid component may be employed to serve as a reaction medium. Alternatively, when one or both of the reactants are solid, intimate contact may be obtained by impact grinding. The initiation of the reaction may be hastened by the addition of a catalytic amount of a strong acid, such as p-toluenesulfonic acid, but this is not essential as the reaction will start spontaneously.

To provide for control of heat exchange, it may sometimes be desirable to employ a reaction medium which is inert to the reactants and products. Examples of such media include ether, tetrahydrofuran, dioxane, ethyl acetate, acetonitrile, benzonitrile, dimethylformamide, dimethyl sulfoxide, benzene, and the like.

The reaction temperature is not critical and any temperature in the range from —80° C. up to the decomposition temperature of the reactants or products is operable. Temperatures in the range from 0° to 150° C. are preferred, and temperatures in the range from 20° C. to 100° C. are particularly suitable.

Pressure is not a critical factor in the reaction of this invention and pressures both above and below atmospheric pressure may be used. Atmospheric pressure is preferred for convenience.

In the examples which follow parts are by weight unless otherwise indicated. Example I represents a preferred embodiment.

EXAMPLE I

Part A

To a solution of 294 parts of dichlorofumaronitrile in 2300 parts of dimethylformamide is added in small portions 356 parts of finely powdered, anhydrous sodium p-toluenesulfinate. The temperature is maintained at 10–20° C. by means of external cooling during the addition of the sulfinate, and for an additional period of five minutes. The reaction mixture is diluted with a large volume of cold water and the reaction mixture is filtered. The filter cake is washed with water and a small volume of methanol. Crystallization from methylene chloride gives 180 parts of 1,2-dicyano-1,2-bis(p-toluenesulfonyl)ethylene.

Part B.—4-Hydroxy-1,7-Bis(4 - Tolylsulfonyl) - 1,3,5-Heptatriene-1,2,6,7-Tetracarbonitrile

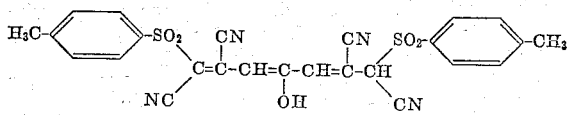

A suspension of 20 parts of 1,2-dicyano-1,2-bis(p-toluenesulfonyl)ethylene in 200 parts of acetone is refluxed for 30 minutes, during which time the starting material disappears and a deep blue crystalline product separates. The reaction mixture is concentrated to about one-half the original volume. The reaction product is collected by filtration, washed with methanol until the washings are essentially colorless, and washed with ether. The yield of deep blue crystals of 4-hydroxy-1,7-bis-(4-tolylsulfonyl)-1,3,5-heptatriene - 1,2,6,7 - tetracarbonitrile is 10 parts. The compound melts at 210–212° C. with decomposition and the molecular extinction coefficients in acetone are 34,800, 32,100, and 11,100 at 632, 585, and 348 mμ, respectively.

Analysis.—Calcd. for $C_{25}H_{18}N_4O_5S_2$: C, 57.88; H, 3.50; N, 10.84; S, 12.37. Found: C, 57.84; H, 3.60; N, 11.25; S, 12.37.

EXAMPLE II

Part A

Sodium p-chlorophenylsulfinate is substituted for sodium p-toluenesulfinate in the procedure of Part A of Example I to prepare 1,2-dicyano-1,2-di(p-chlorophenylsulfonyl)ethylene.

Part B.—1,7-Bis(p-Chlorophenylsulfonyl)-4 - Hydroxy-1,3,5-Heptatriene-1,2,6,7-Tetracarbonitrile

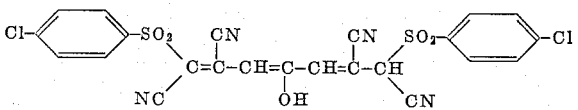

One part of 1,2-dicyano - 1,2 - di(p-chlorophenylsulfonyl)ethylene is suspended in about 100 parts of acetone containing a trace of p-toluenesulfonic acid as catalyst. The mixture is agitated at room temperature and within less than 10 minutes it turns deep blue with the formation of 1,7 - bis(p-chlorophenylsulfonyl)-4-hydroxy-1,3,5-heptatriene-1,2,6,7-tetracarbonitrile.

EXAMPLE III

Part A

Sodium allylsulfinate is substituted for sodium p-toluenesulfinate in the procedure of Part A of Example I to prepare 1,2-di(allylsulfonyl)-1,2-dicyanoethylene.

Part B.—1,7-Bis(Allylsulfonyl)-4-Hydroxy-1,3,5-Heptatriene-1,2,6,7-Tetracarbonitrile

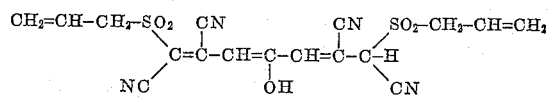

One part of 1,2-di(allylsufonyl)-1,2-dicyanoethylene is dissolved in about 100 parts of acetone containing a trace of p-toluenesulfonic acid as catalyst. The mixture is agitated at room temperature and within less than 10 minutes it turns deep blue with the formation of 1,7-bis(allylsulfonyl) - 4 - hydroxy-1,3,5-heptatriene-1,2,6,7-tetracarbonitrile.

EXAMPLE IV

Part A

Sodium cyclohexylsulfinate is substituted for sodium p-toluenesulfinate in the procedure of Part A of Example I to prepare 1,2-dicyano - 1,2-di(cyclohexylsulfonyl)ethylene.

Part B.—1,7-Bis(Cyclohexylsulfonyl)-4-Hydroxy-1,3,5-Heptatriene-1,2,6,7-Tetracarbonitrile

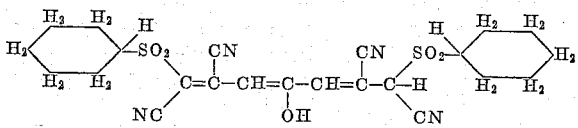

One part of 1,2-dicyano-1,2-di(cyclohexylsulfonyl)ethylene is suspended in about 100 parts of acetone containing a trace of p-toluenesulfonic acid as catalyst. The mixture is agitated at room temperature and within less than 10 minutes it turns deep blue with the formation of 1,7-bis(cyclohexylsulfonyl) - 4 - hydroxy - 1,3,5-heptatriene-1,2,6,7-tetracarbonitrile.

EXAMPLE V

Part A

Sodium p-methoxyphenylsulfinate is substituted for sodium p-toluenesulfinate in the procedure of Part A of Example I to prepare 1,2-dicyano-1,2-di(p-methoxyphenylsulfonyl)ethylene.

Part B.—4-Hydroxy-1,7-Bis(p-Methoxyphenylsulfonyl)-1,3,5-Heptatriene-1,2,6,7-Tetracarbonitrile

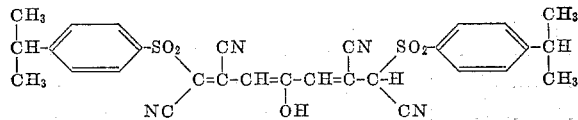

One part of 1,2-dicyano-1,2-di(p-methoxyphenylsulfonyl)ethylene is suspended in about 100 parts of acetone containing a trace of p-toluenesulfonic acid as catalyst. The mixture is agitated at room temperature and within less than 10 minutes it turns deep blue with the formation of 4-hydroxy - 1,7 - bis(p - methoxyphenylsulfonyl)-1,3,5-heptatriene-1,2,6,7-tetracarbonitrile.

EXAMPLE VI

Part A

Sodium p-cumenylsulfinate is substituted for sodium p-toluenesulfinate in the procedure of Part A of Example I to prepare 1,2-di(cumenylsulfonyl)-1,2-dicyanoethylene.

Part B.—1,7-Bis(p-Cumenylsulfonyl)-4-Hydroxyl-1,3,5-Heptatriene-1,2,6,7-Tetracarbonitrile

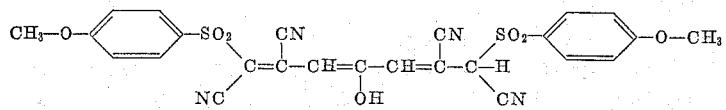

One part of 1,2-di(cumenylsulfonyl)-1,2-dicyanoethylene is dissolved in about 100 parts of acetone and the mixture is agitated at room temperature. Within less than ten minutes it turns deep blue with the formation of 1,7-bis(p-cumenylsulfonyl)-4-hydroxy-1,3,5 - heptatriene-1,2,6,7-tetracarbonitrile.

EXAMPLE VII

1,7-Bis(p-Cumenylsulfonyl)-4-Hydroxy-3(5)-Methyl-1,3,5-Heptatriene-1,2,6,7-Tetracarbonitrile One part of 1,2-di(cumenylsulfonyl)-1,2-dicyanoethylene is dissolved in about 100 parts of methyl ethyl ketone. The mixture is agitated at room temperature and within less than ten minutes it turns deep blue with the formation of 1,7-bis(p-cumenylsulfonyl)-4-hydroxy-3(5)-methyl-1,3,5-heptatriene-1,2,6,7-tetracarbonitrile.

EXAMPLE VIII

1,7-Bis(p-Cumenylsulfonyl)-3,5-Ethylene-4-Hydroxy-1,3,5-Heptatriene-1,2,6,7-Tetracarbonitrile

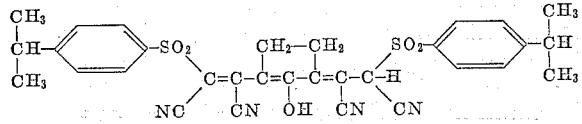

One part of 1,2-di(cumenylsulfonyl)-1,2-dicyanoethylene is dissolved in about 100 parts of cyclopentanone. The mixture is agitated at room temperature and within less than ten minutes it turns deep blue with the formation of 1,7-bis(p-cumenylsulfonyl)-3,5-ethylene-4-hydroxy-1,3,5-heptatriene-1,2,6,7-tetracarbonitrile.

EXAMPLE IX

1,7-Bis(p-Cumenylsulfonyl)-4-Hydroxy-3,5-Trimethylene-1,3,5-Heptatriene-1,2,6,7-Tetracarbonitrile

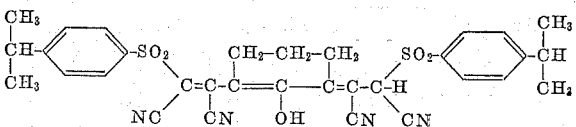

One part of 1,2-di(cumenylsulfonyl)-1,2-dicyanoethylene is dissolved in about 100 parts of cyclohexanone. The mixture is agitated at room temperature and within ten minutes it turns deep blue with the formation of 1,7-bis(p-cumenylsulfonyl) - 4 - hydroxy-3,5-trimethylene-1,3,5-heptatriene-1,2,6,7-tetracarbonitrile.

The use of the products of this invention as colorants for polymeric materials is illustrated in the following example:

EXAMPLE A

To a solution of 2500 parts of cellulose acetatebutyrate in a mixture of 47,500 parts of a mixed solvent comprising equal parts of acetone and methyl ethyl ketone is added one part of 1,7-bis(p-toluenesulfonyl)-4-hydroxy-1,3,5-heptatriene-1,2,6,7-tetracarbonitrile (product of Example I). The resulting deep blue solution is cast on a glass surface, and the solvents are removed by evaporation. The resulting transparent blue coating is useful as a protective coating for the glass or may be stripped therefrom and used as a packaging or wrapping foil. When a vinyl chloride/vinyl acetate copolymer is employed in place of cellulose acetate-butyrate in this example, a similarly useful blue film of the copolymer is obtained. Cellulose acetate-sorbate is similarly prepared in the form of a blue film by the above procedure.

In Table I which follows are shown other 4-hydroxy-1,7-disulfonyl-1,3,5-heptatriene-1,2,6,7 - tetracarbonitriles in this invention. These are prepared by reacting the sodium salt of the indicated known sulfinic acid with dichlorofumaronitrile in the manner of Part A of Example I to obtain the indicated 1,2-dicyano-1,2-disulfonylethylene. This intermediate in turn is reacted with the indicated known α,α,α',α'-tetrahydrogen ketone to obtain the indicated tetracarbonitrile product.

In naming the products obtained when unsymmetrical ketones are employed, a designation such as -3(5)- has been used to indicate that the crude product is a mixture of the compound having the indicated substituent in the 3-position with the compound having the substituent in the 5-position, etc. These mixtures may be used as such for dyeing or may be first separated into their components by recrystallization, selective solvent extraction, chromatography, or other known means.

As many apparently widely different embodiments of this invention may be made without departing from the spirit and scope thereof, it is to be understood that this invention is not limited to the specific embodiments thereof except as defined in the appended claims.

TABLE I

| Sulfinic acid (used as sodium salt) | 1,2-dicyano-1,2-disulfonylethylene obtained by reaction with dichlorofumaronitrile | $\alpha,\alpha,\alpha',\alpha'$-Tetrahydrogen ketone | 4-hydroxy-1,7-disulfonyl-1,3,5-heptatriene-1,2,6,7-tetracarbonitrile product |
|---|---|---|---|
| Phenylsulfinic acid | 1-2-dicyano-1,2-diphenylsulfonylethylene | Diethyl ketone | 4-hydroxy-3,5-dimethyl-1,7-di(phenylsulfonyl)-1,3,5-heptatriene-1,2,6,7-tetracarbonitrile. |
| o-Tolylsulfinic acid | 1,2-dicyano-1,2-di(o-tolylsulfonyl)ethylene | Acetone | 4-hydroxy-1,7-di(o-tolylsulfonyl)-1,3,5-heptatriene-1,2,6,7-tetracarbonitrile. |
| m-Tolylsulfinic acid | 1,2-dicyano-1,2-di(m-tolylsulfonyl)ethylene | Benzyl methyl ketone | 4-hydroxy-3(5)-phenyl-1,7-di(m-tolylsulfonyl)-1,3,5-heptatriene-1,2,6,7-tetracarbonitrile. |
| $\alpha$-Naphthylsulfinic acid | 1,2-dicyano-1,2-di($\alpha$-naphthylsulfonyl)ethylene | Acetone | 4-hydroxy-1,7-di($\alpha$-naphthylsulfonyl)-1,3,5-heptatriene-1,2,6,7-tetracarbonitrile. |
| $\beta$-Naphthylsulfinic acid | 1,2-dicyano-1,2-di($\beta$-naphthylsulfonyl)ethylene | Diethyl ketone | 4-hydroxy-3,5-dimethyl-1,7-di($\beta$-naphthylsulfonyl)-1,3,5-heptatriene-1,2,6,7-tetracarbonitrile. |
| Ethylsulfinic acid | 1-2-dicyano-1,2-di(ethylsulfonyl)ethylene | 4-methyl-2-pentanone | 1,7-di(ethylsulfonyl)-4-hydroxy-3(5)isopropyl-1,3,5-heptatriene-1,2,6,7-tetracarbonitrile. |
| n-Butylsulfinic acid | 1,2-dicyano-1,2-di(n-butylsulfonyl)ethylene | Dibenzyl ketone | 1,7-di(n-butylsulfonyl)-4-hydroxy-3,5-diphenyl-1,3,5-heptatriene-1,2,6,7-tetracarbonitrile. |
| Benzylsulfinic acid | 1-2-dicyano-1,2-(benzylsulfonyl)ethylene | Ethyl n-propyl ketone | 1,7-di(benzylsulfonyl)-3(5)ethyl-4-hydroxy-5(3)methyl-1,3,5-heptatriene-1,2,6,7-tetracarbonitrile. |
| p-Bromophenylsulfinic acid | 1,2-dicyano-1,2-di(p-bromophenylsulfonyl)ethylene | Acetone | 1,7-di(p-bromophenylsulfonyl)-4-hydroxy-1,3,5-heptatriene-1,2,6,7-tetracarbonitrile. |
| p-Fluorophenylsulfinic acid | 1,2-dicyano-1,2-di(p-fluorophenylsulfonyl)ethylene | do | 1,7-di(p-fluorophenylsulfonyl)-4-hydroxy-1,3,5-heptatriene-1,2,6,7-tetracarbonitrile. |
| p-Iodophenylsulfinic acid | 1,2-dicyano-1,2-di(p-iodophenylsulfonyl)ethylene | Diethyl ketone | 4-hydroxy-1,7-di(p-iodophenylsulfonyl)-3,5-dimethyl-1,3,5-heptatriene-1,2,6,7-tetracarbonitrile. |
| 1-octylsulfinic acid | 1,2-dicyano-1,2-di(octylsulfonyl)ethylene | Methyl n-hexyl ketone | 4-hydroxy-1,7-di(octylsulfonyl)-3(5)-n-pentyl-1,3,5-heptatriene-1,2,6,7-tetracarbonitrile. |
| Dodecylsulfinic acid | 1,2-dicyano-1,2-di(dodecylsulfonyl)ethylene | Acetone | 1,7-di(dodecylsulfonyl)-4-hydroxy-1,3,5-heptatriene-1,2,6,7-tetracarbonitrile. |
| Heptylsulfinic acid | 1,2-dicyano-1,2-di(heptylsulfonyl)ethylene | Di(n-heptadecyl) ketone | 1,7-di(heptylsulfonyl)-3,5-dihexadecyl-4-hydroxy-1,3,5-heptatriene-1,2,6,7-tetracarbonitrile. |
| Octadecylsulfinic acid | 1,2-dicyano-1,2-di(octadecylsulfonyl)ethylene | Acetone | 4-hydroxy-1,7-di(octadecylsulfonyl)-1,3,5-heptatriene-1,2,6,7-tetracarbonitrile. |
| o-Cyanophenylsulfinic acid | 1,2-dicyano-1,2-di(o-cyanophenylsulfonyl)ethylene | 3,5-dimethylcyclohexanone | 1,7-di(o-cyanophenylsulfonyl)-3,5-dimethyltrimethylene-4-hydroxy-1,3,5-heptatriene-1,2,6,7-tetracarbonitrile. |
| m-Cyanophenylsulfinic acid | 1,2-dicyano-1,2-di(m-cyanophenylsulfonyl)ethylene | Acetone | 1,7-di(m-cyanophenylsulfonyl)-4-hydroxy-1,3,5-heptatriene-1,2,6,7-tetracarbonitrile. |
| p-Cyanophenylsulfinic acid | 1,2-dicyano-1,2-di(p-cyanophenylsulfonyl)ethylene | Cyclobutanone | 1,7-di(p-cyanophenylsulfonyl)-4-hydroxy-3,5-methylene-1,3,5-heptatriene-1,2,6,7-tetracarbonitrile. |
| 2-Dibenzofurylsulfinic acid | 1,2-dicyano-1,2-di(2-dibenzofurylsulfonyl)ethylene | Acetone | 1,7-di(2-dibenzofurylsulfonyl)-4-hydroxy-1,3,5-heptatriene-1,2,6,7-tetracarbonitrile. |
| Isopentylsulfinic acid | 1,2-dicyano-1,2-di(isopentylsulfonyl)ethylene | Di(3,5-dimethylbenzyl) ketone | 4-hydroxy-1,7-di(isopentylsulfonyl)-3,5-di(3,5-dimethylphenyl)-1,3,5-heptatriene-1,2,6,7-tetracarbonitrile. |
| $\beta$-Chloroethylsulfinic acid | 1,2-dicyano-1,2-di($\beta$-chloroethylsulfonyl)ethylene | Acetone | 1,7-di($\beta$-chloroethylsulfonyl)-4-hydroxy-1,3,5-heptatriene-1,2,6,7-tetracarbonitrile. |
| $\beta$-Cyanoethylsulfinic acid | 1,2-dicyano-1,2-di($\beta$-cyanoethylsulfonyl)ethylene | do | 1,7-di($\beta$-cyanoethylsulfonyl)-4-hydroxy-1,3,5-heptatriene-1,2,6,7-tetracarbonitrile. |
| $\beta$-Hydroxyethylsulfinic acid | 1,2-dicyano-1,2-di($\beta$-hydroxyethylsulfonyl)ethylene | do | 4-hydroxy-1,7-di($\beta$-hydroxyethylsulfonyl)-1,3,5-heptatriene-1,2,6,7-tetracarbonitrile. |
| $\beta$-Methoxyethylsulfinic acid | 1,2-dicyano-1,2-di($\beta$-methoxyethylsulfonyl)ethylene | 5-hexene-2-one | 3(5)allyl-4-hydroxy-1,7-di($\beta$-methoxyethylsulfonyl)-1,3,5-heptatriene-1,2,6,7-tetracarbonitrile. |
| $\beta$-($\beta$-Hydroxyethylsulfonyl)ethylsulfinic acid | 1,2-dicyano-1,2-di($\beta$-[$\beta$-hydroxyethylsulfonyl]ethylsulfonyl)ethylene | Acetone | 4-hydroxy-1,7-di($\beta$-[$\beta$-hydroxyethylsulfonyl]ethylsulfonyl)1,3,5-heptatriene-1,2,6,7-tetracarbonitrile. |
| o-Methoxyphenylsulfinic acid | 1,2-dicyano-1,2-di(o-methoxyphenylsulfonyl)ethylene | do | 4-hydroxy-1,7-di(o-methoxyphenylsulfonyl)-1,3,5-heptatriene-1,2,6,7-tetracarbonitrile. |
| o-Carboxyphenylsulfinic acid | 1,2-dicyano-1,2-di(o-carboxyphenylsulfonyl)ethylene | do | 1,7-di(o-carboxyphenylsulfonyl)-4-hydroxy-1,3,5-heptatriene-1,2,6,7-tetracarbonitrile. |
| p-Carboxyphenylsulfinic acid | 1,2-dicyano-1,2-di(p-carboxyphenylsulfonyl)ethylene | do | 1,7-di(p-carboxyphenylsulfonyl)-4-hydroxy-1,3,5-heptatriene-1,2,6,7-tetracarbonitrile. |
| o-Methoxycarbonylphenylsulfinic acid | 1,2-dicyano-1,2-di(o-methoxycarbonylphenylsulfonyl)ethylene | do | 4-hydroxy-1,7-di(o-methoxycarbonylphenlsulfonyl)-1,3,5-heptatriene-1,2,6,7-tetracarbonitrile. |
| p-Methoxycarbonylphenylsulfinic acid | 1,2-dicyano-1,2-di(p-methoxycarbonylphenylsulfonyl)ethylene | 2,3-dimethyl-2-heptene-6-one | 4-hydroxy-1,7-di(p-methoxycarbonylphenylsulfonyl)-3(5)-(2,3-dimethyl-2-buten-1-yl)-1,3,5-heptatriene-1,2,6,7-tetracarbonitrile. |
| 5-chloro-2-cyano-3-methylphenylsulfinic acid | 1,2-dicyano-1,2-di(5-chloro-2-cyano-3-methylphenylsulfonyl)ethylene | Acetone | 1,7-di(5-chloro-2-cyano-3-methylphenylsulfonyl)-4-hydroxy-1,3,5-heptatriene-1,2,6,7-tetracarbonitrile. |
| 2-cyano-5-methylphenylsulfinic acid | 1,2-dicyano-1,2-di(2-cyano-5-methylphenylsulfonyl)ethylene | do | 1,7-di(2-cyano-5-methylphenylsulfonyl)-4-hydroxy-1,3,5-heptatriene-1,2,6,7-tetracarbonitrile. |
| 4-cyano-3-methylphenylsulfinic acid | 1,2-dicyano-1,2-di(4-cyano-3-methylphenylsulfonyl)ethylene | 1-cyclopentenyl-acetone | 1,7-di(4-cyano-3-methylphenylsulfonyl)-3(5)cyclopentenyl-4-hydroxy-1,3,5-heptatriene-1,2,6,7-tetracarbonitrile. |
| 2-cyano-3,5-dimethylphenylsulfinic acid | 1,2-dicyano-1,2-di(2-cyano-3,5-dimethylphenylsulfonyl)ethylene | Acetone | 1,7-di(2-cyano-3,5-dimethylphenylsulfonyl)-4-hydroxy-1,3,5-heptatriene-1,2,6,7-tetracarbonitrile. |
| 1-cyano-2-naphthylsulfinic acid | 1,2-dicyano-1,2-di(1-cyano-2-naphthylsulfonyl)ethylene | do | 1,7-di(1-cyano-2-naphthylsulfonyl)-4-hydroxy-1,3,5-heptatriene-1,2,6,7-tetracarbonitrile. |
| 8-cyano-1-naphthylsulfinic acid | 1,2-dicyano-1,2-di(8-cyano-1-naphthlysulfonyl)ethylene | do | 1,7-di(8-cyano-1-naphthylsulfonyl)-4-hyroxy-1,3,5-heptatriene-1,2,6,7-tetracarbonitrile. |
| Ethoxycarbonylmethylsulfinic acid | 1,2-dicyano-1,2-di(ethoxycarbonylmethylsulfonyl)ethylene | do | 1,7-di(ethoxycarbonylmethylsulfonyl)-4-hydroxy-1,3,5-heptatriene-1,2,6,7-tetracarbonitrile. |
| $\beta$-Ethoxycarbonylethylsulfinic acid | 1,2-dicyano-1,2-di($\beta$-ethoxycarbonylethylsulfonyl)ethylene | 5-hexyne-2-one | 1,7-di($\beta$-ethoxycarbonylethylsulfonyl)-3(5)-(2-propynyl)-4-hydroxy-1,3,5-heptatriene-1,2,6,7-tetracarbonitrile. |
| 4-cyanobutylsulfinic acid | 1,2-dicyano-1,2-di(4-cyanobutylsulfonyl)ethylene | Acetone | 1,7-di(4-cyanobutylsulfonyl)-4-hydroxy-1,3,5-heptatriene-1,2,6,7-tetracarbonitrile. |
| 5-methoxycarbonylpentylsulfinic acid | 1,2-dicyano-1,2-di(5-methoxycarbonylpentylsulfonyl)ethylene | do | 4-hydroxy-1,7-di(5-methoxycarbonylpentylsulfonyl)-1,3,5-heptatriene-1,2,6,7-tetracarbonitrile. |
| p-Acetylaminophenylsulfinic acid | 1,2-dicyano-1,2-di(p-acetylaminophenylsulfonyl)ethylene | do | 1,7-di(p-acetylaminophenylsulfonyl)-4-hydroxy-1,3,5-heptatriene-1,2,6,7-tetracarbonitrile. |
| p-Phenylsulfonylphenylsulfinic acid | 1,2-dicyano-1,2-di(p-phenylsulfonylphenylsulfonyl)ethylene | do | 4-hydroxy-1,7-di(p-phenylsulfonylphenylsulfonyl)-1,3,5-heptatriene-1,2,6,7-tetracarbonitrile. |
| $\beta$-Phenoxyethylsulfinic acid | 1,2-dicyano-1,2-di($\beta$-phenoxyethylsulfonyl)ethylene | do | 4-hydroxy-1,7-di($\beta$-phenoxyethylsulfonyl)-1,3,5-heptatriene-1,2,6,7-tetracarbonitrile. |
| 3-methoxypropylsulfinic acid | 1,2-dicyano-1,2-di(3-methoxypropylsulfonyl)ethylene | do | 4-hydroxy-1,7-di(3-methoxypropylsulfonyl)-1,3,5-heptatriene-1,2,6,7-tetracarbonitrile. |
| p-Phenoxyphenylsulfinic acid | 1,2-dicyano-1,2-di(p-phenoxyphenylsulfonyl)ethylene | 5,7-octadiene-2-one | 4-hydroxy-3(5)-(2,4-pentadienyl)-1,7-di(p-phenoxyphenylsulfonyl)-1,3,5-heptatriene-1,2,6,7-tetracarbonitrile. |
| m-Nitrophenylsulfinic acid | 1,2-dicyano-1,2-di(m-nitrophenylsulfonyl)ethylene | Acetone | 4-hydroxy-1,7-di(m-nitrophenylsulfonyl)-1,3,5-heptatriene-1,2,6,7-tetracarbonitrile. |
| Dichloromethylsulfinic acid | 1,2-dicyano-1,2-di(dichloromethylsulfonyl)ethylene | do | 1,7-di(dichloromethylsulfonyl)-4-hydroxy-1,3,5-heptatriene-1,2,6,7-tetracarbonitrile. |
| Trichloromethylsulfinic acid | 1,2-dicyano-1,2-di(trichloromethylsulfonyl)ethylene | do | 4-hydroxy-1,7-di(trichloromethylsulfonyl)-1,3,5-heptatriene-1,2,6,7-tetracarbonitrile. |
| 1,7,7,-trimethylbicyclo[2.2.1]heptan-2-ylsulfinic acid | 1,2-dicyano-1,2-di(1,7,7-trimethylbicyclo[2.2.1]heptan-2-ylsulfonyl)ethylene | do | 4-hydroxy-1,7-di(1,7,7-trimethylbicyclo[2.2.1]heptan-2-ylsulfonyl)-1,3,5-heptatriene-1,2,6,7-tetracarbonitrile. |

TABLE I—Continued

| Sulfinic acid (used as sodium salt) | 1,2-dicyano-1,2-disulfonylethylene obtained by reaction with dichlorofumaronitrile | $\alpha,\alpha,\alpha',\alpha'$-Tetrahydrogen ketone | 4-hydroxy-1,7-disulfonyl-1,3,5-heptatriene-1,2,6,7-tetracarbonitrile product |
|---|---|---|---|
| 4-methyl-2,6-dinitrophenylsulfinic acid. | 1,2-dicyano-1,2-di(4-methyl-2,6-dinitrophenylsulfonyl)ethylene. | Acetone | 4-hydroxy-1,7-di(4-methyl-2,6-dinitrophenylsulfonyl)-1,3,5-heptatriene-1,2,6,7-tetracarbonitrile. |
| 2,4,6-trimethylphenylsulfinic acid. | 1,2-dicyano-1,2-di(2,4,6-trimethylphenylsulfonyl)ethylene. | do | 4-hydroxy-1,7-di(2,4,6-trimethylphenylsulfonyl)-1,3,5-heptatriene-1,2,6,7-tetracarbonitrile. |
| 2-methyl-5-isopropylphenylsulfinic acid. | 1,2-dicyano-1,2-di(2-methyl-5-isopropylphenylsulfonyl)ethylene. | do | 4-hydroxy-1,7-di(2-methyl-5-isopropylphenylsulfonyl)-1,3,5-heptatriene-1,2,6,7-tetracarbonitrile. |
| 5,6,7,8-tetrahydro-1-naphthylsulfinic acid. | 1,2-dicyano-1,2-di(5,6,7,8-tetrahydro-1-naphthylsulfonyl)ethylene. | do | 4-hydroxy-1,7-di(5,6,7,8-tetrahydro-1-naphthylsulfonyl)-1,3,5-heptatriene-1,2,6,7-tetracarbonitrile. |
| 4-chloro-1-naphthylsulfinic acid. | 1,2-dicyano-1,2-di(4-chloro-1-naphthylsulfonyl)ethylene. | do | 1,7-di(4-chloro-1-naphthylsulfonyl)-4-hydroxy-1,3,5-heptatriene-1,2,6,7-tetracarbonitrile. |
| 1-chloro-2-naphthylsulfinic acid. | 1,2-dicyano-1,2-di(1-chloro-2-naphthylsulfonyl)ethylene. | do | 1,7-di(1-chloro-2-naphthylsulfonyl)-4-hydroxy-1,3,5-heptatriene-1,2,6,7-tetracarbonitrile. |
| 8-nitro-1-naphthylsulfinic acid. | 1,2-dicyano-1,2-di(8-nitro-1-naphthylsulfonyl)ethylene. | do | 4-hydroxy-1,7-di($\beta$-nitro-1-naphthylsulfonyl)-1,3,5-heptatriene-1,2,6,7-tetracarbonitrile. |
| p-Biphenylylsulfinic acid | 1,2-dicyano-1,2-di(p-bi-phenylylsulfonyl)ethylene. | do | 1,7-di(p-biphenylylsulfonyl)-4-hydroxy-1,3,5-heptatriene-1,2,6,7-tetracarbonitrile. |
| 2-anthrylsulfinic acid | 1,2-dicyano-1,2-di(2-anthrylsulfonyl)ethylene. | do | 1,7-di(2-anthrylsulfonyl)-4-hydroxy-1,3,5-heptatriene-1,2,6,7-tetracarbonitrile. |
| o-Ethoxyphenylsulfinic acid | 1,2-dicyano-1,2-di(o-ethoxyphenylsulfonyl)ethylene. | do | 1,7-di(o-ethoxyphenylsulfonyl)-4-hydroxy-1,3,5-heptatriene-1,2,6,7-tetracarbonitrile. |
| 4-bromo-3-formylphenylsulfinic acid. | 1,2-dicyano-1,2-di(4-bromo-3-formylphenylsulfonyl)ethylene. | do | 1,7-di(4-bromo-3-formylphenylsulfonyl)-4-hydroxy-1,3,5-heptatriene-1,2,6,7-tetracarbonitrile. |
| 4-bromo-3-carboxyphenylsulfinic acid. | 1,2-dicyano-1,2-di(4-bromo-3-carboxyphenylsulfonyl)ethylene. | do | 1,7-di(4-bromo-3-carboxyphenylsulfonyl)-4-hydroxy-1,3,5-heptatriene-1,2,6,7-tetracarbonitrile. |
| 4-chloro-2-nitrophenylsulfinic acid. | 1,2-dicyano-1,2-di(4-chloro-2-nitrophenylsulfonyl)ethylene. | do | 1,7-di(4-chloro-2-nitrophenylsulfonyl)-4-hydroxy-1,3,5-heptatriene-1,2,6,7-tetracarbonitrile. |
| Triphenylmethylsulfinic acid | 1,2-dicyano-1,2-di(triphenylmethylsulfonyl)ethylene. | do | 4-hydroxy-1,7-di(triphenylmethylsulfonyl)-1,3,5-heptatriene-1,2,6,7-tetracarbonitrile. |
| 5-hydroxy-1-naphthylsulfinic acid. | 1,2-dicyano-1,2-di(5-hydroxy-1-naphthylsulfonyl)ethylene. | do | 4-hydroxy-1,7-di(5-hydroxy-1-naphthylsulfonyl)-1,3,5-heptatriene-1,2,6,7-tetracarbonitrile. |
| 6-hydroxy-2-naphthylsulfinic acid. | 1,2-dicyano-1,2-di(6-hydroxy-2-naphthylsulfonyl)ethylene. | do | 4-hydroxy-1,7-di(6-hydroxy-2-naphthylsulfonyl)-1,3,5-heptatriene-1,2,6,7-tetracarbonitrile. |
| 1-anthraquinonylsulfinic acid | 1,2-dicyano-1,2-di(1-anthraquinonylsulfonyl)ethylene. | do | 1,7-di(1-anthraquinonylsulfonyl)-4-hydroxy-1,3,5-heptatriene-1,2,6,7-tetracarbonitrile. |
| 2-anthraquinonylsulfinic acid | 1,2-dicyano-1,2-di(2-anthraquinonylsulfonyl)ethylene. | do | 1,7-di(2-anthraquinonylsulfonyl)-4-hydroxy-1,3,5-heptatriene-1,2,6,7-tetracarbonitrile. |
| 7-chloro-2-anthraquinonylsulfinic acid. | 1,2-dicyano-1,2-di(7-chloro-2-anthraquinonylsulfonyl)ethylene. | do | 1,7-di(7-chloro-2-anthraquinonylsulfonyl)-4-hydroxy-1,3,5-heptatriene-1,2,6,7-tetracarbonitrile. |
| 4-hydroxy-1-anthraquinonylsulfinic acid. | 1,2-dicyano-1,2-di(4-hydroxy-1-anthraquinonylsulfonyl)ethylene. | do | 4-hydroxy-1,7-di(4-hydroxy-1-anthraquinonylsulfonyl)-1,3,5-heptatriene-1,2,6,7-tetracarbonitrile. |
| 2-ethoxy-4,5-dimethoxyphenylsulfinic acid. | 1,2-dicyano-1,2-di(2-ethoxy-4,5-dimethoxyphenylsulfonyl)ethylene. | do | 1,7-di(2-ethoxy-4,5-dimethoxyphenylsulfonyl)-4-hydroxy-1,3,5-heptatriene-1,2,6,7-tetracarbonitrile. |
| 3-carboxy-4-hydroxyphenylsulfinic acid. | 1,2-dicyano-1,2-di(3-carboxy-4-hydroxphenylsulfonyl)ethylene. | do | 1,7-di(3-carboxy-4-hydroxphenylsulfonyl)-4-hydroxy-1,3,5-heptatriene-1,2,6,7-tetracarbonitrile. |
| 2-furylsulfinic acid | 1,2-dicyano-1,2-di(2-furylsulfonyl)ethylene. | do | 1,7-di(2-furylsulfonyl)-4-hydroxy-1,3,5-heptatriene-1,2,6,7-tetracarbonitrile. |
| 2-thienylsulfinic acid | 1,2-dicyano-1,2-di(2-thienylsulfonyl)ethylene. | do | 4-hydroxy-1,7-di(2-thienylsulfonyl)-1,3,5-heptatriene-1,2,6,7-tetracarbonitrile. |
| 2-pyrrolylsulfinic acid | 1,2-dicyano-1,2-di(2-pyrrolylsulfonyl)ethylene. | do | 4-hydroxy-1,7-di(2-pyrrolylsulfonyl)-1,3,5-heptatriene-1,2,6,7-tetracarbonitrile. |
| o-Aminophenylsulfinic acid | 1,2-dicyano-1,2-di(o-aminophenylsulfonyl)ethylene. | do | 1,7-di(o-aminophenylsulfonyl)-4-hydroxy-1,3,5-heptatriene,1,2,6,7-tetracarbonitrile. |
| m-Aminophenylsulfinic acid | 1,2-dicyano-1,2-di(m-aminophenylsulfonyl)ethylene. | do | 1,7-di(m-aminophenylsulfonyl)-4-hydroxy-1,3,5-heptatriene-1,2,6,7-tetracarbonitrile. |
| p-Dimethylaminophenylsulfinic acid. | 1,2-dicyano-1,2-di(p-dimethylaminophenylsulfonyl)ethylene. | do | 1,7-di(p-dimethylaminophenylsulfonyl)-4-hydroxy-1,3,5-heptatriene-1,2,6,7-tetracarbonitrile. |
| Iodomethylsulfinic acid | 1,2-dicyano-1,2-di(iodomethylsulfonyl)ethylene. | do | 4-hydroxy-1,7-di(iodomethylsulfonyl)-1,3,5-heptatriene-1,2,6,7-tetracarbonitrile. |
| Trifluoromethylsulfinic acid | 1,2-dicyano-1,2-di(trifluoromethylsulfonyl)ethylene. | do | 1,7-di(trifluoromethylsulfonyl)-4-hydroxy-1,3,5-heptatriene-1,2,6,7-tetracarbonitrile. |
| Perfluoroisopropylsulfinic acid. | 1,2-dicyano-1,2-di(perfluoroisopropylsulfonyl)ethylene. | do | 4-hydroxy-1,7-di-(perfluoroisopropylsulfonyl)-1,3,5-heptatriene,1,2,6,7-tetracarbonitrile. |

The embodiments of the invention in which an exclusive property or privilege is claimed are defined as follows:

1. A compound of the general formula $$R-SO_2-\underset{\underset{CN}{|}}{\overset{\overset{CN}{|}}{C}}=\underset{}{\overset{\overset{R'}{|}}{C}}-\underset{\underset{OH}{|}}{\overset{}{C}}=C-\underset{}{\overset{\overset{R''}{|}}{C}}=\underset{\underset{CN}{|}}{\overset{\overset{CN}{|}}{C}}-CH-SO_2R$$

wherein R contains up to 20 carbon atoms and is selected from the class consisting of hydrocarbyl and substituted hydrocarbyl wherein the substituents are selected from the class consisting of amino, hydrocarbyl substituted amino, hydroxy, carbamoyl, cyano, halo, nitro, sulfo, hydrocarbyloxysulfonyl, hydrocarbyloxy, and hydrocarbyloxycarbonyl, and R' and R" are selected from the class consisting of hydrogen and hydrocarbyl of up to 20 carbon atom, with the proviso that R' and R" taken together constitute an aliphatic hydrocarbon diradical of up to 20 carbon atoms.

2. 1,7-bis(p-toluenesulfonyl)-4-hydroxy-1,3,5-heptatriene-1,2,6,7-tetracarbonitrile.

3. 1,7-bis(allylsulfonyl)-4-hydroxy-1,3,5-heptatriene-1,2,6,7-tetracarbonitrile.

4. 1,7-bis(phenylsulfonyl)-4-hydroxy-3,5-dimethyl-1,3,5-heptatriene-1,2,6,7-tetracarbonitrile.

References Cited in the file of this patent

UNITED STATES PATENTS 2,894,936    Benson    July 14, 1959
3,005,015    Melby    Oct. 17, 1961

OTHER REFERENCES

Bergmann: "The Chemistry of Acetylene and Related Compounds," 1948, page 80.